United States Patent
Benisty

(10) Patent No.: US 10,296,249 B2
(45) Date of Patent: May 21, 2019

(54) SYSTEM AND METHOD FOR PROCESSING NON-CONTIGUOUS SUBMISSION AND COMPLETION QUEUES

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/585,808

(22) Filed: May 3, 2017

(65) Prior Publication Data
US 2018/0321864 A1    Nov. 8, 2018

(51) Int. Cl.
*G06F 3/06* (2006.01)
*G06F 1/3287* (2019.01)
*G06F 12/0811* (2016.01)

(52) U.S. Cl.
CPC .......... *G06F 3/0625* (2013.01); *G06F 1/3287* (2013.01); *G06F 3/0634* (2013.01);
(Continued)

(58) Field of Classification Search
CPC .... G06F 3/0625; G06F 3/0634; G06F 3/0659; G06F 3/0688; G06F 12/0811; G06F 2212/283; G06F 2212/3042; G06F 1/3287
See application file for complete search history.

(56) References Cited

U.S. PATENT DOCUMENTS 7,386,674 B1    6/2008  Lango
8,554,968 B1    10/2013 Onufryk et al.
(Continued)

FOREIGN PATENT DOCUMENTS

EP    2312457 A2    4/2011

OTHER PUBLICATIONS

NVM Express standard, Revision 1.2, Nov. 3, 2014, pp. 1-205.*
(Continued)

*Primary Examiner* — Glenn Gossage
(74) *Attorney, Agent, or Firm* — Brinks Gilson & Lione

(57) ABSTRACT

Systems and methods for processing non-contiguous submission and completion queues are disclosed. Non-Volatile Memory Express (NVMe) implements a paired submission queue and completion queue mechanism, with host software on a host device placing commands into the submission queue. The submission and completion queues may be contiguous or non-contiguous in host device memory. Non-contiguous queues may be defined by a link to a list on the host device that lists the non-contiguous sections in memory. In practice, the memory device stores the list in one type of memory (such as a dynamic random access memory (DRAM) cache) and the link in a different type of memory (such as always-on memory or non-volatile memory). In this way, the link may be accessed in various modes (such as low power mode) in order to recreate the list in DRAM. At least a part of the list of non-contiguous sections may be restored in response to the memory device exiting low power mode, or in response to determining that part or all of the list of noncontiguous sections is corrupted. The list of non-contiguous sections may comprise a list of physical region pages.

18 Claims, 13 Drawing Sheets

(52) U.S. Cl.
CPC .......... *G06F 3/0659* (2013.01); *G06F 3/0688* (2013.01); *G06F 12/0811* (2013.01); *G06F 3/0679* (2013.01); *G06F 2212/283* (2013.01); *G06F 2212/3042* (2013.01)

(56) References Cited

U.S. PATENT DOCUMENTS

| | | |
|---|---|---|
| 2003/0204552 A1 | 10/2003 | Zuberi |
| 2005/0195635 A1 | 9/2005 | Conley et al. |
| 2006/0161733 A1 | 7/2006 | Beckett et al. |
| 2012/0151472 A1 | 6/2012 | Koch et al. |
| 2014/0281040 A1 | 9/2014 | Liu |
| 2015/0067291 A1 | 3/2015 | Miyamoto et al. |
| 2015/0074338 A1 | 3/2015 | Raviv et al. |
| 2015/0081933 A1 | 3/2015 | Vucinic et al. |
| 2015/0127882 A1 | 5/2015 | Carlson et al. |
| 2015/0177994 A1* | 6/2015 | Vucinic ................. G06F 3/0613 711/103 |
| 2015/0186068 A1* | 7/2015 | Benisty ................. G06F 3/0673 711/154 |
| 2015/0186074 A1* | 7/2015 | Benisty ................. G06F 3/0659 711/115 |
| 2015/0254088 A1 | 9/2015 | Chou et al. |
| 2016/0004438 A1 | 1/2016 | Moon et al. |
| 2016/0026388 A1 | 1/2016 | Jeong et al. |
| 2016/0062669 A1* | 3/2016 | Chu ....................... G06F 3/0611 711/103 |
| 2016/0077740 A1 | 3/2016 | Hussain et al. |
| 2016/0085718 A1 | 3/2016 | Huang |
| 2016/0124876 A1 | 5/2016 | Vucinic et al. |
| 2016/0140041 A1 | 5/2016 | Niu et al. |
| 2016/0147442 A1 | 5/2016 | Baderdinni et al. |
| 2016/0162219 A1* | 6/2016 | Erez ..................... G06F 3/0653 711/103 |
| 2016/0188510 A1 | 6/2016 | Singh et al. |
| 2016/0216905 A1 | 7/2016 | Yazdani et al. |
| 2016/0267016 A1 | 9/2016 | Lee et al. |
| 2016/0291866 A1 | 10/2016 | Olcay et al. |
| 2016/0292007 A1 | 10/2016 | Ding et al. |
| 2016/0321010 A1 | 11/2016 | Hashimoto |
| 2016/0321012 A1 | 11/2016 | Clark et al. |
| 2017/0060422 A1 | 3/2017 | Sharifie et al. |
| 2017/0060749 A1 | 3/2017 | Segev et al. |
| 2017/0075629 A1 | 3/2017 | Manohar et al. |
| 2017/0075828 A1 | 3/2017 | Monji et al. |
| 2017/0083252 A1 | 3/2017 | Singh et al. |
| 2017/0123659 A1 | 5/2017 | Nam et al. |
| 2017/0131917 A1* | 5/2017 | Yun ....................... G06F 3/0611 |
| 2017/0177222 A1 | 6/2017 | Singh et al. |
| 2017/0286205 A1* | 10/2017 | Jeong .................. G06F 11/0772 |
| 2018/0059987 A1* | 3/2018 | Nimmagadda ....... G06F 3/0626 |
| 2018/0074757 A1* | 3/2018 | Yamaguchi ........... G06F 3/0659 |
| 2018/0136875 A1* | 5/2018 | Nimmagadda ......... G06F 3/061 |
| 2018/0173461 A1 | 6/2018 | Carroll et al. |

OTHER PUBLICATIONS

Landsman, "What's New in NVMe Rev 1.2?" (from "NVM Express: Unlock the Potential"), Flash Memory Summit 2014, Santa Clara, CA, Aug. 4-7, 2014, pp. 30-50.*

Specification and Drawings of U.S. Appl. No. 15/457,676 entitled "Storage System and Method for Thermal Throttling via Command Arbitration" filed Mar. 13, 2017; 32 pages.

Ellefson, Janene; SSD Product Market Manager—PCIe, Micron Technology, "NVM Express: Unlock Your Solid State Drives Potential", Flash Memory Summit 2013, Santa Clara, CA., 114 pages.

Marks, Kevin; Dell, Inc., "An NVM Express Tutorial", Flash Memory Summit 2013, Santa Clara, CA., 92 pages.

U.S. Appl. No. 15/148,409, filed May 6, 2016, 45 pages.

International Search Report and Written Opinion for Application No. PCT/US2018/019930 dated Jun. 4, 2018, 16 pages.

International Search Report and Written Opinion in Application No. PCT/US2018/019933 dated May 22, 2018, 12 pages.

International Search Report and Written Opinion in Application No. PCT/US2018/019905 dated May 4, 2018, 13 pages.

International Search Report and Written Opinion in Application No. PCT/US2018/019941 dated Jul. 13, 2018, 18 pages.

International Search Report and Written Opinion in Application No. PCT/US2018/019914 dated Jul. 13, 2018, 18 pages.

International Search Report and Written Opinion in Application No. PCT/US2018/019909 dated Jul. 6, 2018, 18 pages.

International Search Report and Written Opinion in Application No. PCT/US2018/019911 dated May 28, 2018, 15 pages.

\* cited by examiner

SYSTEM AND METHOD FOR PROCESSING NON-CONTIGUOUS SUBMISSION AND COMPLETION QUEUES

BACKGROUND

Non-Volatile Memory Express (NVMe) is a standard for accessing non-volatile storage media attached via Peripheral Component Interconnect Express (PCIe) bus. NVMe may be used with a variety of non-volatile storage media, such as solid state drives (SSDs). One focus of NVMe relates to input/output (I/O) communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
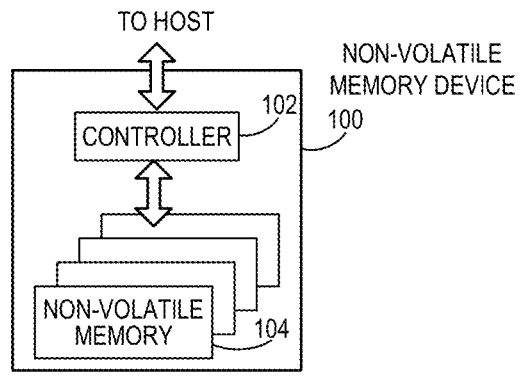
FIG. 1A is a block diagram of an exemplary non-volatile memory device.

NVMe is based on a paired Submission Queue (SQ) and Completion Queue (CQ). The host device, using host software, places commands into a respective Submission Queue. The memory device, via the memory device controller, places entries in the associated Completion Queue, with the entries indicative of completions commands. In one implementation, Submission Queues and Completion Queues are allocated in the host device memory, such as a host memory buffer. The allocation of memory to the Submission Queues and Completion Queues in the host memory buffer may be physically located contiguously or non-contiguously.

In the instance of non-contiguous or non-consecutive NVMe Submission Queue and/or Completion Queue, a Physical Region Page (PRP) list is provided to the memory device. The PRP list contains a list of pointers that describes the location of each physical section of the relevant queue, as discussed in more detail below. In practice, the PRP list is stored in the host device memory and is not modified during the entire life of the relevant queue.

The memory device may manage the PRP list in one of several approaches. In a first approach, the memory device may cache the PRP list. In particular, at the phase of queue creation, the memory device fetches the entire PRP list from host memory and caches the entire PRP list internally in static random access memory (SRAM), internal dynamic random access memory (DRAM) or non-volatile memory. The first approach allows for the memory device to access the PRP list stored in host memory only once at the initialization phase. In other execution phases, the memory device may fetch the next required PRP from the internal cache within the memory device and not from host memory. In this regard, the first approach reduces the traffic over the PCIe bus, thereby reducing the power consumption while increasing the overall performance since other PCIe packets might be issued during this time. However, the first approach includes drawbacks as to the cache area and as to operation in low power modes. In particular, this approach necessitates additional storage for caching the PRP lists. Further, those PRP lists need to be retained when the memory device enters into any low power mode.

A second approach is to fetch the next required PRP from host memory. In particular, the memory device may fetch the next PRP from a respective PRP list located in host memory whenever required. When another PRP is required, the memory device deletes the previous PRP from internal storage and replaces it by the next PRP which is fetched from host memory. Using the second approach, only one or two PRPs are cached internally at each point by the memory device. In this regard, the second approach enables a smaller memory device area, since the required cache buffer is relatively small. On the other hand, the second approach includes extra PCIe traffic, which may lead to performance degradation.

In one implementation, a third approach comprises a hybrid of the first and second approaches. In particular, the memory device may store the PRP lists and the pointers in different types of memory. In a first specific implementation, the memory device stores the pointers in a first type of cache and the PRP lists in a second type of cache. In particular, the PRP lists may be stored in memory device DRAM while the pointers to the PRP lists may be cached in always-on memory. In this way, the pointer to the PRP list may be stored in a first type of memory that maintains data therein during at least a part of operation of the memory device (such as in low power mode) and the PRP list may be stored in a second type of memory that does not maintain data therein during the at least a part of operation of the memory device (such as a DRAM which loses data in low power mode, as discussed below). In a second specific implementation, the memory device stores the pointers in non-volatile memory (such as flash memory) and the PRP lists in cache (such as in DRAM). In still another implementation, the memory device stores the PRP list in cache, and stores the pointer in a different type of cache or in non-volatile memory depending on the priority of the command that includes the pointer. In this regard, the always-on memory may be active when the memory device is in low power mode.

In normal operation, the memory device uses the PRP lists, which are stored in the internal DRAM, while avoiding the extra transfers over PCIe bus. In non-normal operation (e.g., when detecting an unrecoverable error on the PRP lists, when entering deep power mode, when the cache memory storing the PRP lists are to be used for another purpose, or otherwise when the PRP lists are to be reconstructed), the memory device may re-store at least a part of the PRP list (e.g., reconstruct the PRP lists) using the pointer to the PRP list stored in always-on memory. As one example, when detecting any unrecoverable error on the PRP lists that are stored in the DRAM, the memory device is able to re-fetch the relevant PRP list from host memory using the pointers stored in the always-on memory, and re-store the relevant PRP list in DRAM. One example of a non-recoverable error is double error detection. Other non-recoverable errors are contemplated. As another example, the memory device may delete some of the PRP cache when the cache is needed for other purposes. Thereafter, the memory device may re-fetch the PRP lists using the PRP pointer, and cache the PRP lists.

As still another example, when entering a deep low power mode such as DPS3, the PRP lists stored in the DRAM may be deleted while shutting off the power to the DRAM. When waking up (e.g., entering normal or non-low power mode), the memory device may re-fetch the PRP lists from host memory using the pointers to the PRP lists stored in the always-on RAM. In this regard, the hybrid approach may reduce the required always-on memory size while having improved power consumption results.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory die(s) 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD™) or a micro secure digital (micro-SD™) card. In an alternate embodiment, the memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the non-volatile memory die(s) 104, depending on controller capabilities. In any of the embodiments described herein, more than a single channel may exist between the controller and the non-volatile memory die(s) 104, even if a single channel is shown in the drawings.

Figure 1B:
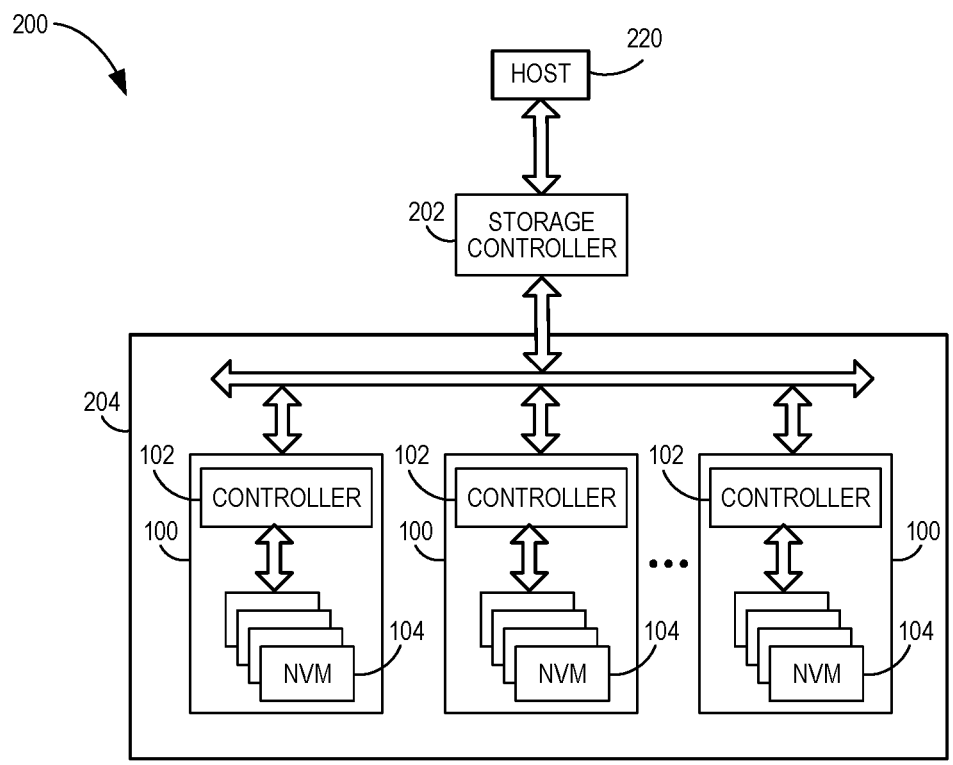
FIG. 1B is a block diagram of a storage module that includes a plurality of non-volatile memory devices and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA)

interface, a peripheral component interconnect express (PCIe) interface, an embedded MultiMediaCard (eMMC™) interface, a SD interface, or a Universal Serial Bus (USB) interface, as examples. The storage module 200, in one embodiment, may be a solid state drive (SSD), such as found in portable computing devices, such as laptop computers and tablet computers, and mobile phones.

Figure 1C:
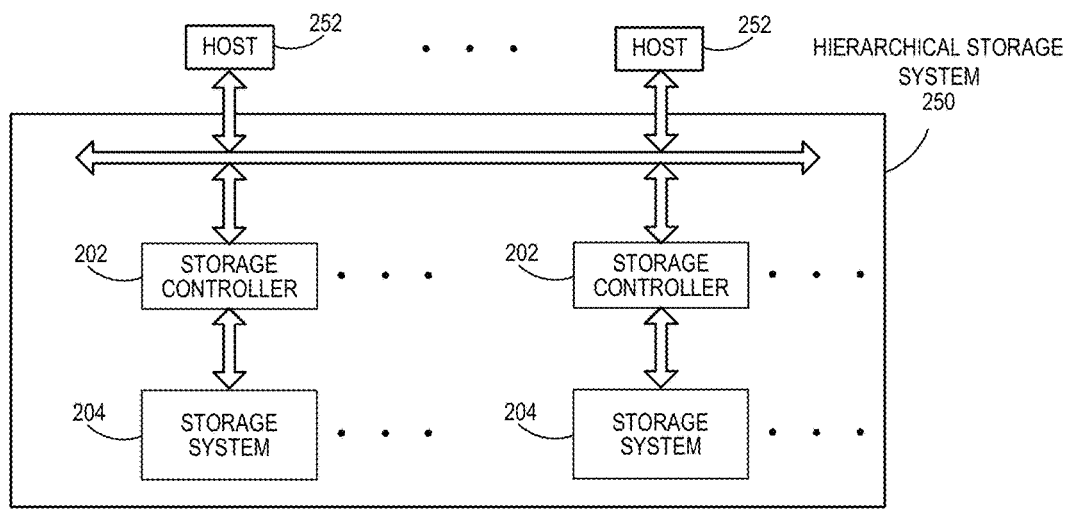
FIG. 1C is a block diagram of a hierarchical storage system.

FIG. 1C is a block diagram illustrating a hierarchical storage system 250. The hierarchical storage system 250 may include a plurality of storage controllers 202, each of which controls a respective storage system 204. Host systems 252 may access memories within the hierarchical storage system 250 via a bus interface. Example bus interfaces may include a non-volatile memory express (NVMe) interface, a fiber channel over Ethernet (FCoE) interface, an SD™ interface, a USB interface, a SATA interface, a PCIe interface, or an eMMC™ interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
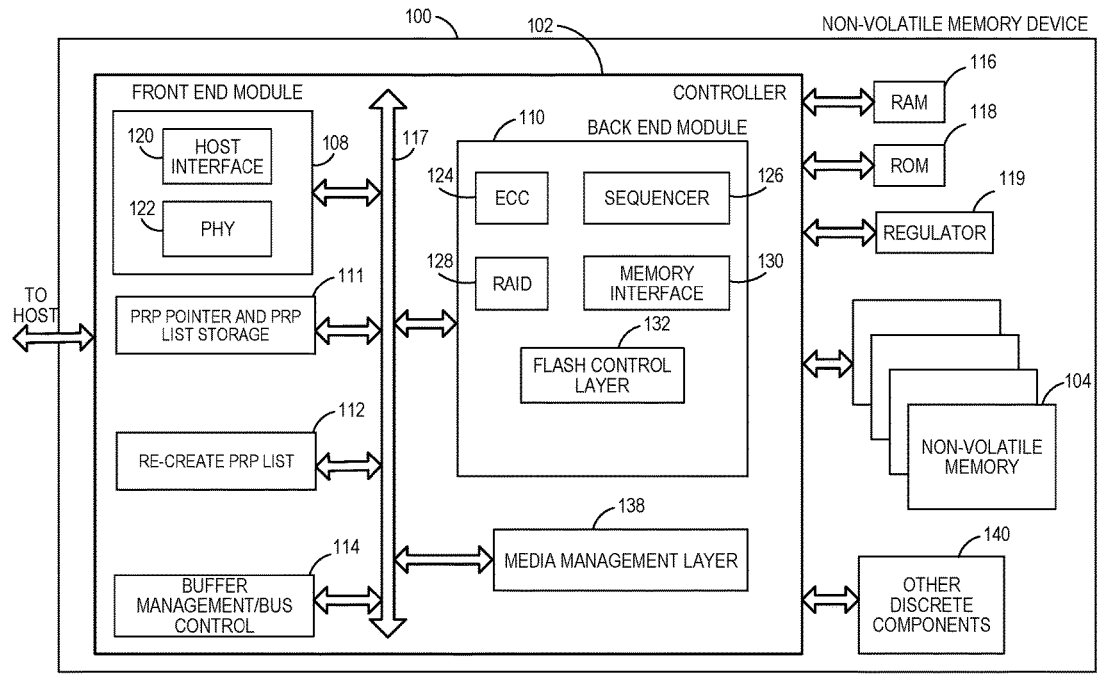
FIG. 2A is a block diagram of exemplary components of a controller of the non-volatile memory device of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the modules includes the portion of the memory that comprises instructions executable by the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer management/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116. Further, RAM 116 may include different types of cache, such as always-on memory and DRAM.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, Serial ATA (SATA), SATA Express, Serial Attached SCSI (SAS), Fibre Channel, USB, PCIe, and NVMe. The host interface 120 may typically facilitate transfer for data, control signals, and timing signals.

The back end module 110 may include an error correction code (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of memory device 100. One type of management table includes a logical-to-physical address mapping table. The size of the logical-to-physical address mapping table may grow with memory size. In this regard, the logical-to-physical address mapping table for high capacity storage device (e.g., greater than 32 gigabytes (GB) may be too large to store in static random access memory (SRAM), and may be stored in non-volatile memory die(s) 104 along with user and host data. Therefore, accesses to non-volatile memory die(s) 104 may first require reading the logical-to-physical address mapping table from non-volatile memory die(s) 104.

Additional modules of the non-volatile memory device 100 illustrated in FIG. 2A may include a media management layer 138, which performs wear leveling of memory cells of the non-volatile memory die(s) 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus control module 114 are optional components that may not be necessary in the controller 102.

Other modules of the non-volatile memory device 100 illustrated in FIG. 2A may include PRP pointer and PRP list storage module 111 and re-create PRP list module 112. These modules are shown as separate from the other modules of the non-volatile memory device 100, although in other configurations, one or more of them may be part of any of the other modules.

As discussed in more detail below, the memory device controller may store the pointer to the PRP list in a different memory from the PRP list itself. For example, the pointer to the PRP list may be stored in always-on memory (such as always-on RAM), while the PRP list may be stored in DRAM. In that regard, the PRP pointer and PRP list storage module 111 may store the pointer to the PRP list in the designated section of always-on memory, and store the PRP list to DRAM. Further, the re-create PRP list module 112 is configured to re-create the PRP list responsive to a determination that the PRP list is to be re-created (e.g., in response to determining an unrecoverable error in the PRP list or in response to exiting a low power mode in which power was withdrawn to the DRAM storing the PRP list). In particular, the re-create PRP list module 112 may access the pointer to the PRP list in always-on memory, use the pointer to the PRP list to obtain the PRP list again from the host device, and to store the obtained PRP list in DRAM.

Figure 2B:
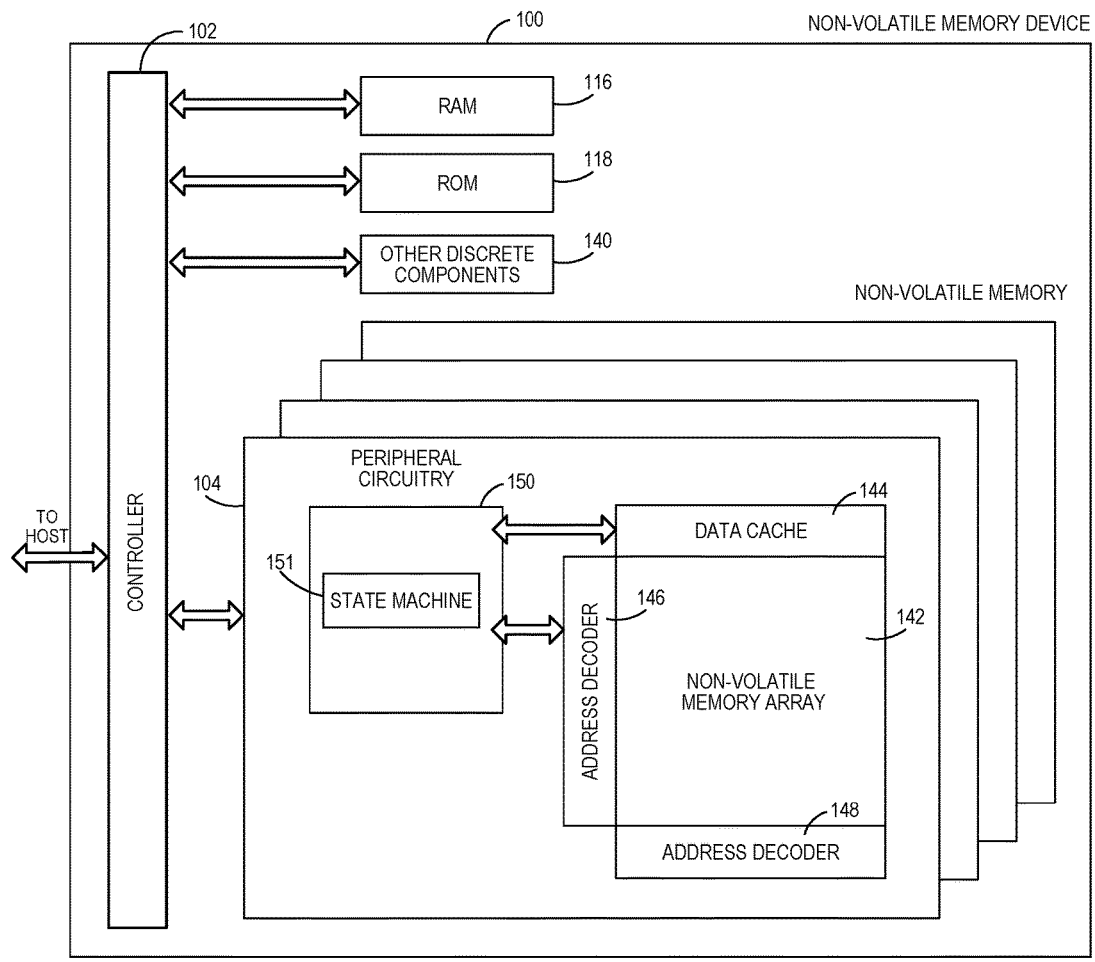
FIG. 2B is a block diagram of exemplary components of a non-volatile memory die of the non-volatile memory device of FIG. 1A.

FIG. 2B is a block diagram illustrating exemplary components of a non-volatile memory die(s) 104 in more detail. The non-volatile memory die(s) 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge on the floating gate. The presence or absence of charges on the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die(s) 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die(s) 104 may include peripheral circuitry 150. The peripheral circuitry 150 may include a state machine 151 that provides status information to the controller 102. Other functionality of the state machine 151 is described in further detail below.

Figure 3:
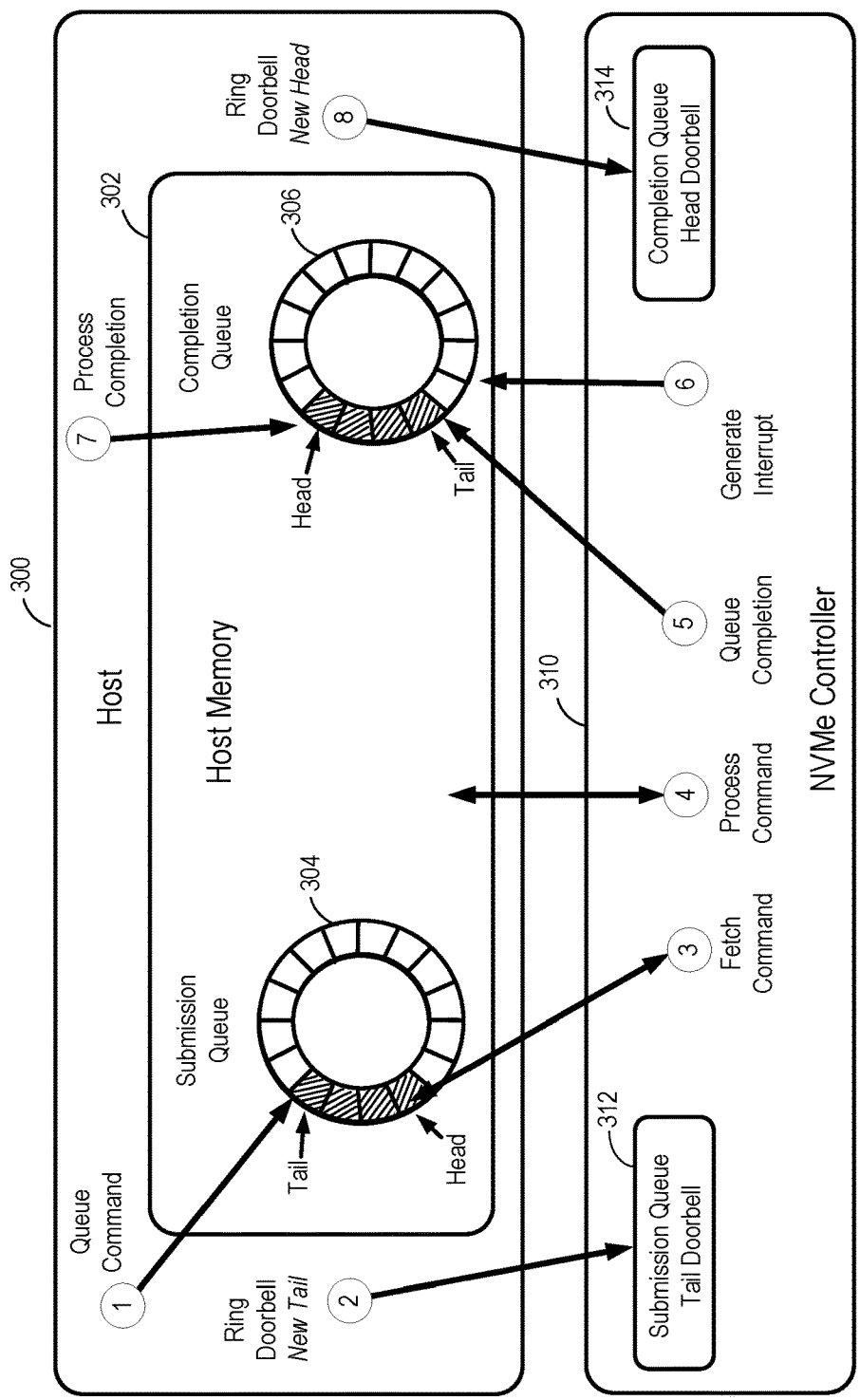
FIG. 3 is a block diagram of a host device and NVMe controller illustrating a sequence for the host device and a memory device to request and process an NVMe command.

FIG. 3 shows a host 300 and an NVMe controller 310 and illustrates a sequence of steps for executing a command via the NVMe standard. As shown, the host device 300 includes host memory 302, and the memory device includes a controller, such as an NVMe controller 310. In one implementation, the host memory 302 includes a submission queue 304 and a completion queue 306. In practice, at the initialization phase, the host device 300 creates one or more submission queues and one or more corresponding completion queues. As discussed above, in one implementation, the submission queues and completion queues may have a 1:1 correlation, and in another implementation, the submission queues and completion queues do not have a 1:1 correlation.

For initialization, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a transport layer packet (TLP) read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, such as shown in FIG. 3, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer), the memory device may monitor a communication interface between the host device 300 and the memory device for particular communications, such as writing to the submission queue(s) resident on the memory device. For example, the memory device can monitor the transport layer packets (TLPs) on the PCI Express bus to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device queued one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly, so that the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) in the submission queue 304) and before step 3 (whereby the memory device fetches the command(s)), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 kilobytes (Kb). In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In a submission queue resident in the host device, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1megabyte (Mb) transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCIe TLPs to transfer the data from the memory device to the host device 300. Typically, the transferred data is stored in the host memory 302 of the host device 300 based on an indication in the command (e.g., the command may include an address at which to store the requested data).

After completing the data transfer, at step 5, the memory device controller sends a completion message to the relevant completion queue 306. As mentioned above, at the initialization phase, the host device 300 associates submission queues with completion queues, so that the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use a message signalled interrupt (MSIe)).

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
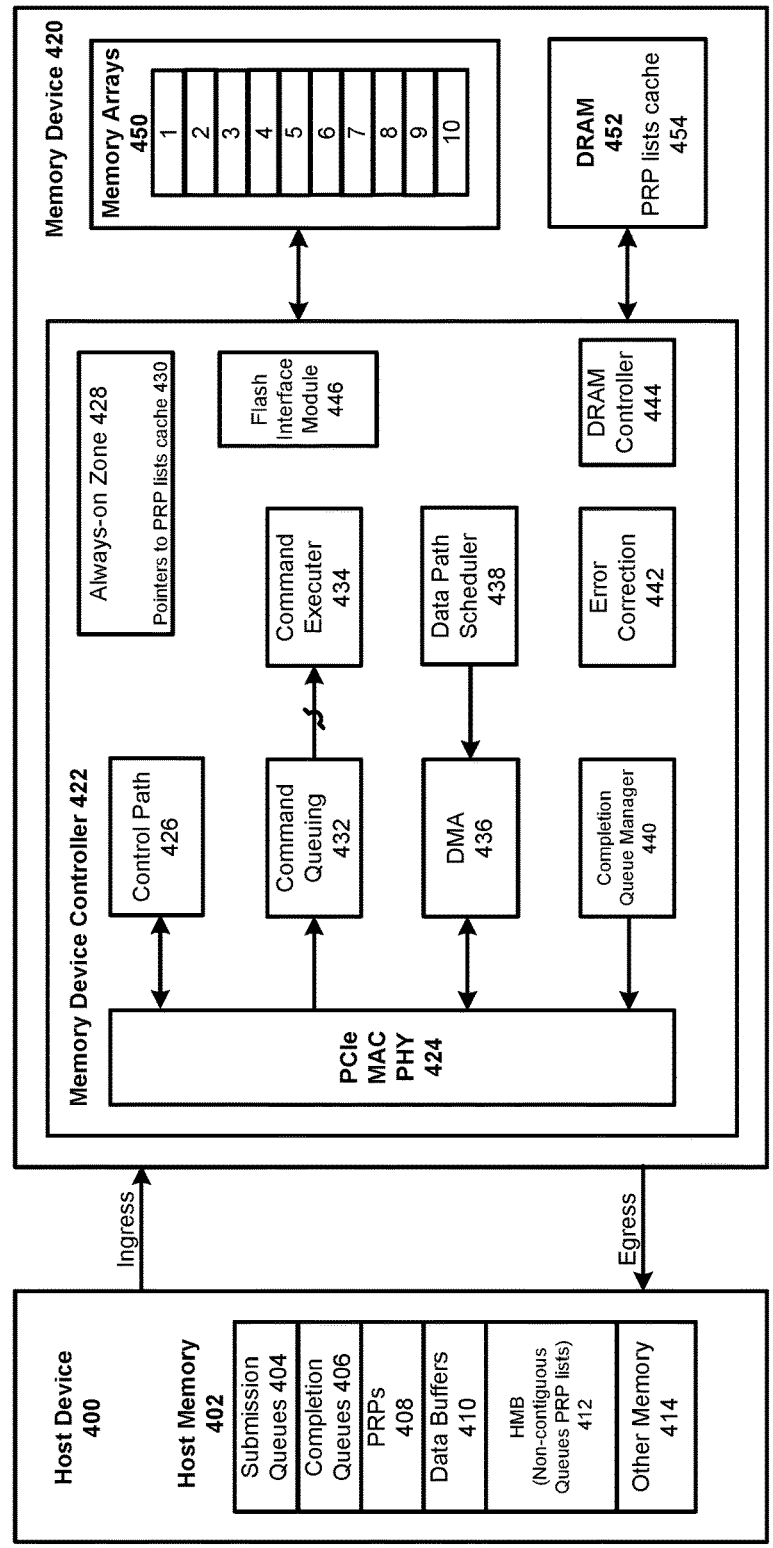
FIG. 4 is a block diagram of other exemplary components of a host device and a memory device.

FIG. 4 is a block diagram of other exemplary components of a host device 400 and a memory device 420. The host device 400 includes host memory 402, which may comprise one or more submission queues 404, one or more completion queues 406, Physical Region Pages (PRPs) 408 (such as data PRP lists and non-contiguous NVMe queues PRP lists), data buffers 410, Host Memory Buffer (HMB) 412, and other memory 414.

The allocation of memory to the Submission Queues and Completion Queues in the host memory buffer may be physically located contiguously or non-contiguously. In the instance of a non-contiguous NVMe Submission Queue and/or Completion Queue, a PRP list is provided to the memory device. The PRP list contains a list of pointers that describes the location of each physical section of the relevant queue, as discussed in more detail below. In practice, the PRP list is stored in the host device memory and is not modified during the entire life of the relevant queue. In addition, a pointer to the PRP list may be used to point to at least a part of the PRP list. PRP 408 thus includes the PRP lists, with the pointers to the PRP list stored in the submission queues. As discussed in more detail below, there may be multiple PRP lists stored in PRP 408.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device. In one example (with the SQ and the CQ resident on the host device), responsive to a TLP write request (sent via the ingress path) by the host device to the doorbell register on the memory device (with the write to the doorbell register indicating that there is a command on the SQ), the memory device uses a TLP read request (sent via the egress path) to fetch the write command from the SQ (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the CQ (indicating that the write command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

As another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with buffering between each of the serial operations. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing the data to the host device, the memory device uses a TLP write request to write an entry to the CQ (indicating that the read command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to a CQ Doorbell Write register indicating that the host device has reviewed the entry on the CQ.

Optionally, the CQ and SQ may be resident in the memory device, such as in the Controller Memory Buffer (CMB). In that instance, the host device may send a TLP write request (sent via the ingress path) to the memory device to write to the SQ. Likewise, the memory device may send a TLP write request (sent via the egress path) to generate an interrupt to the host device.

Memory device 420 includes the memory device controller 422 and memory arrays 450. Memory arrays 450 may be segmented in various ways, such as in 10 sections as illustrated in FIG. 4. The memory device controller 422 may incorporate one or all of a PCIe media access control (MAC) and physical layer (PHY) interface 424. The command may enter various phases, some of which may be performed by memory device 420. Blocks shown in FIG. 4 are directed to various functions associated with the different phases of command processing. Memory device controller 422 may include control path 426, which may handle various aspects of the submission queues 404, such as command fetching from the submission queues 404 and PRP fetching, as discussed in more detail below. Further, memory device controller 422 includes always-on zone 428, which may comprise cache memory that is always on (or on during certain phases such as low power mode). In this regard, always-on zone 428 may be powered during phases of operation of memory device 420 that DRAM 452 is not. As one example, always-on zone 428 may be on or powered during a low power state of memory device 420 whereas DRAM 452 is not powered during the low power state of memory device 420. Always-on zone 428 may include at least one feature directed to the PRP, such as one or more pointers to the PRP lists, which may be stored in Pointers to PRP lists cache 430. Thus, in one implementation, always-on zone 428 may implement all the logic that is not shut off or powered down, even during low power states while the power is shut off for other components, such as DRAM 452. Likewise, DRAM 452 may store the PRP lists in PRP lists cache 454. DRAM Controller 444 is configured to control access to DRAM 452, when DRAM 452 is present in memory device 420.

In addition, command queuing 432 is configured to queue part or all of the fetched NVMe commands for further processing. Command executer 434 is configured to select the next pending command for further execution from command queuing 432. As shown in FIG. 4, there may be several queues from which to select from. Data path scheduler 438 is configured to schedule one or more types of data transfers. As one example, read data may arrive from different memory arrays in parallel. Data path scheduler 438 may arbitrate from amongst the different data transfers.

Direct Memory Access (DMA) 436 is configured to perform the actual data transfer between host device 400 and memory device 420. Completion queue manager 440 is configured to post completion entries to the completion queues 406, while also handling the relevant pointers. Error correction 442 is configured to correct the data that is fetched from the memory arrays 450. Flash interface module 446 is configured to control and access the memory arrays 450.

Figure 5:
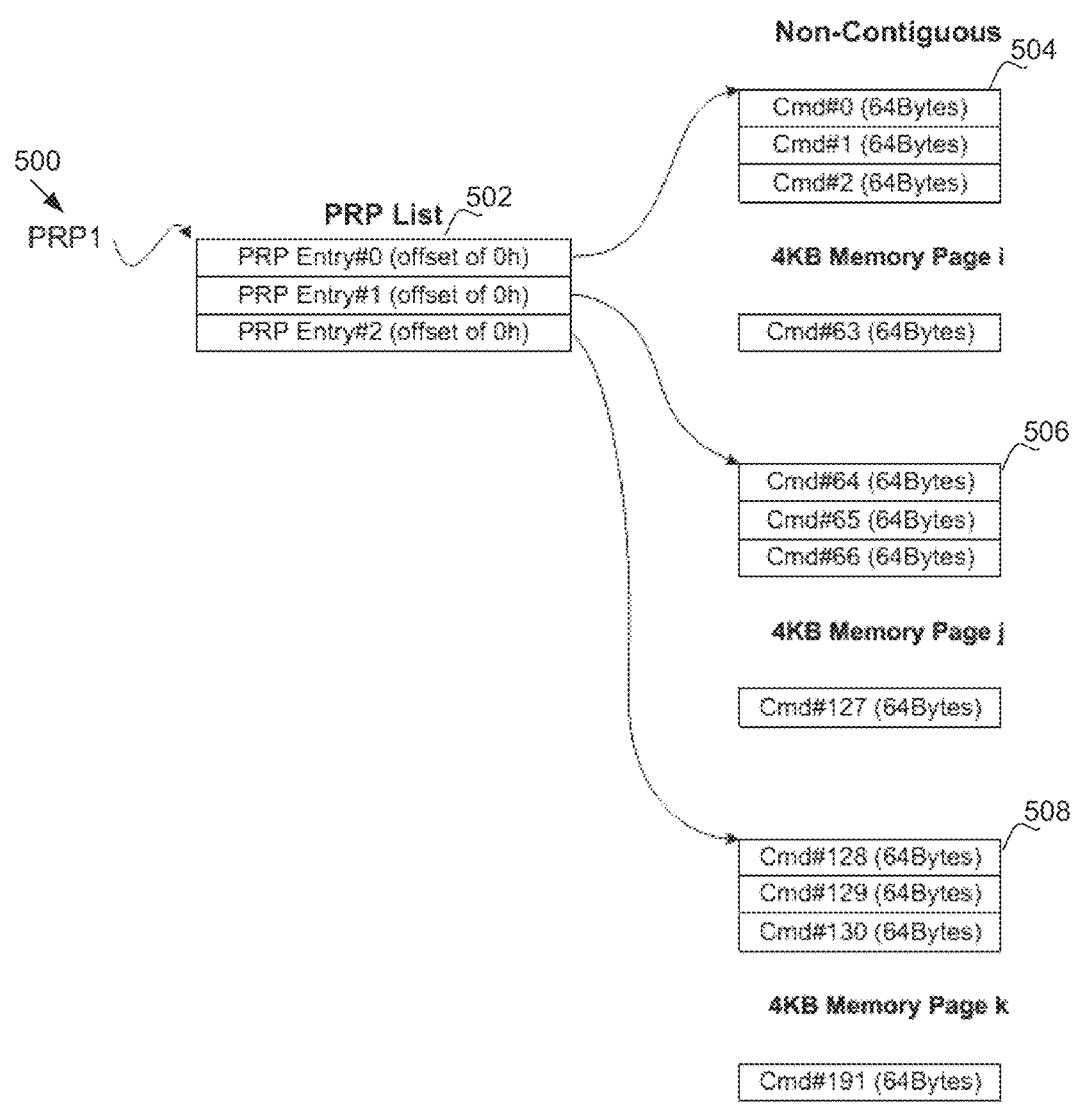
FIG. 5 is a block diagram of PRP1, the physical region pages (PRP) list, and the sections of non-contiguous memory for the PRP list.

NVMe may include a scalable host controller interface designed to address the needs of Enterprise and Client systems that utilize PCI Express based solid state drives. In this regard, the interface may provide optimized command submission and completion paths. NVMe may include support for parallel operation by supporting up to 65,535 I/O Queues with up to 64K outstanding commands per I/O Queue. Since in some scenarios the size of each NVMe queue is not small, the standard defines the non-contiguous NVMe queue feature. FIG. 5 is a block diagram of PRP1 500, the PRP list 502, and the sections or chunks of non-contiguous memory 504, 506, 508 for the PRP list 502, thus depicting the structure of a non-contiguous queue. When creating a non-contiguous queue, the host device 400 provides a pointer to the PRP list as part of the NVMe command. The PRP list is not deleted from the host device memory during the entire life of the non-contiguous queue.

As shown in FIG. 5, the pointer (PRP1 500) to the PRP list 502, with each entry of the PRP list, points to a different chunk of the non-contiguous queue. In particular, PRP Entry#0 points to chunk 504, PRP Entry#1 points to chunk 506, and PRP Entry#2 points to chunk 508. In one implementation, the maximum size of an NVMe queue is 64K entries. Further, entry size of the submission queue is 64-bytes; therefore, 1024 PRPs are used to describe a queue size of 64 KB. Entry size of the completion queue is 16-bytes and therefore 256 PRPs are used to describe a queue size of 64 KB. This calculation is based on the assumption that Host Memory Page Size (MPS) is 4 KB. In this regard, each PRP points to a 4 KB buffer.

As can be shown in the table below, the required storage for holding the PRP lists is not negligible, and requires DRAM when having many non-contiguous queues while the size of each one of them is 64K entries:

| Number of NVMe I/O submission and completion non-contiguous queues | Total PRPs | Total Size |
|---|---|---|
| 1 | 1024 + 256 = 1280 | 10 KB |
| 128 | 163, 840 | 1.25 MB |
| 256 | 327, 680 | 2.5 MB |
| N | 1280 * N | 1280 * N * 8 |

Figure 6:
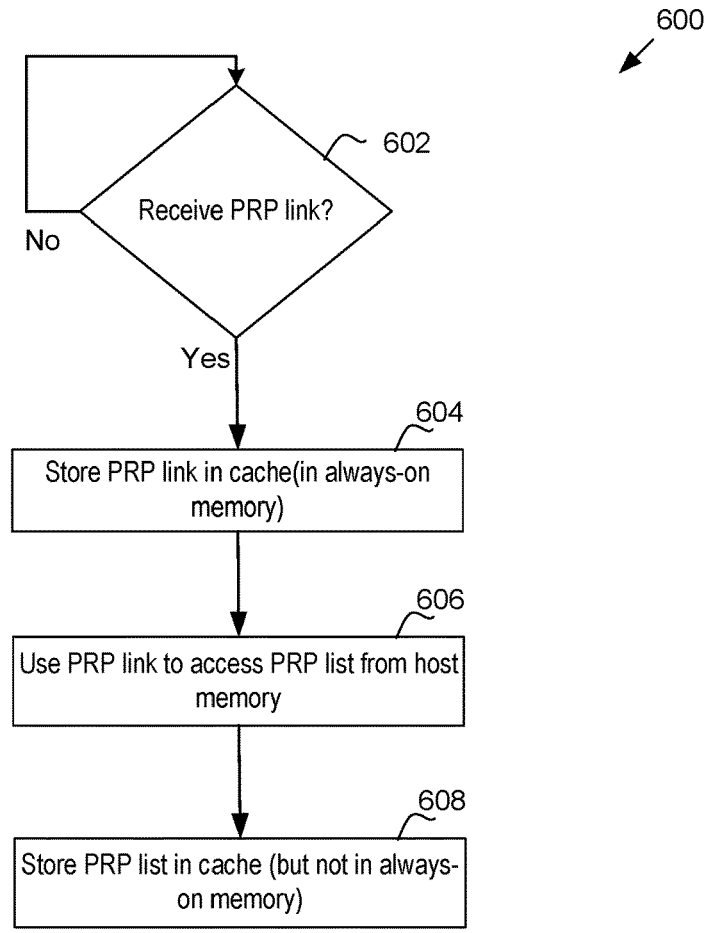
FIG. 6 is a flow chart of storing a PRP pointer in always-on memory and storing a PRP list in cache but not in always-on memory.

FIG. 6 is a flow chart 600 of storing the PRP pointer in always-on memory and storing the PRP list in cache but not in always-on memory. At 602, the memory device determines whether it has received the pointer or link to the PRP list. If so, at 604, the PRP link is stored in cache in always-on memory. At 606, the memory device uses the PRP link to access the PRP list from host memory. As illustrated in FIG. 5, the PRP link or pointer (PRP1 500) points to the PRP list 502. At 608, the memory device stores the PRP list in cache, such as DRAM that is not always-on memory.

Figure 7:
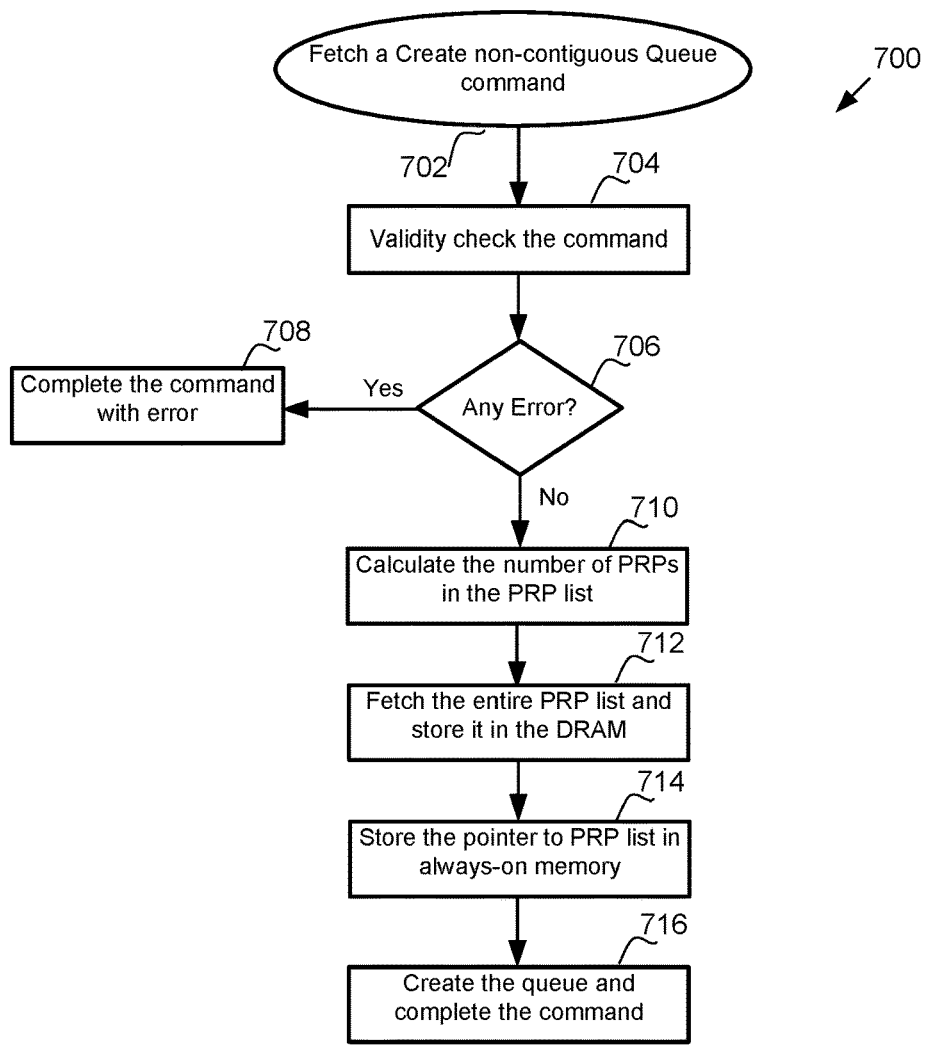
FIG. 7 is a flow chart of creating a non-contiguous queue and fetching the PRP list and the pointer to the PRP list.

FIG. 7 is a flow chart 700 of creating a non-contiguous queue and fetching the PRP list and the pointer to the PRP list. In particular, FIG. 7 illustrates the memory device flow when receiving a create non-contiguous queue request. At 702, the memory device fetches the create non-contiguous queue command. At 704, the memory device checks the validity of the command. At 706, the memory device determines if there is any error. If any error is detected, at 708, the command is terminated or completed with error. Otherwise, at 710, the memory device calculates the size of the PRP list (the number of PRPs in the PRP list) and, at 712, the memory device fetches the entire list from host memory (such as from PRPs 408 in host memory 402). At 712, the entire PRP list is cached internally and stored in DRAM or any other internal memory. At 714, the pointer to the PRP list which was provided as part of the create queue command is stored in always-on memory. As discussed above, always-on memory may be different from DRAM, and may be more expensive memory since it is always on and consumes power even when the memory device is in low power modes. However, only the pointer (8 bytes where some of the least significant bits (LSBs) are set to 0) to the PRP list is stored there. At 716, the device completes processing of the command (e.g., creates the queue and completes the command).

In another implementation, the pointer may be stored in non-volatile memory, such as in flash memory. Similar to always-on memory, flash memory does not lose its data upon loss of power and is different from DRAM. In this regard, the pointer may be stored in flash memory whereas the PRP list is stored in another type of memory (such as DRAM). Storing the pointer in flash memory is advantageous in that flash memory is cheaper than always-on memory; however, flash has higher latency than always-on memory. In recreating or restoring the PRP list using the stored pointer, latency may be less of an issue. In still another implementation, pointers to the PRP lists may be stored either in always-on memory or in flash memory. The memory device may determine whether to store the pointer in always-on memory or in flash memory based on priority of the queues (and in turn the latency needs). As one example, a pointer to a PRP list for a command from a higher priority queue is stored in always-on memory (with a lower latency) while a pointer to a PRP list for a command from a lower priority queue is stored in flash memory (with a higher latency).

Figure 8:
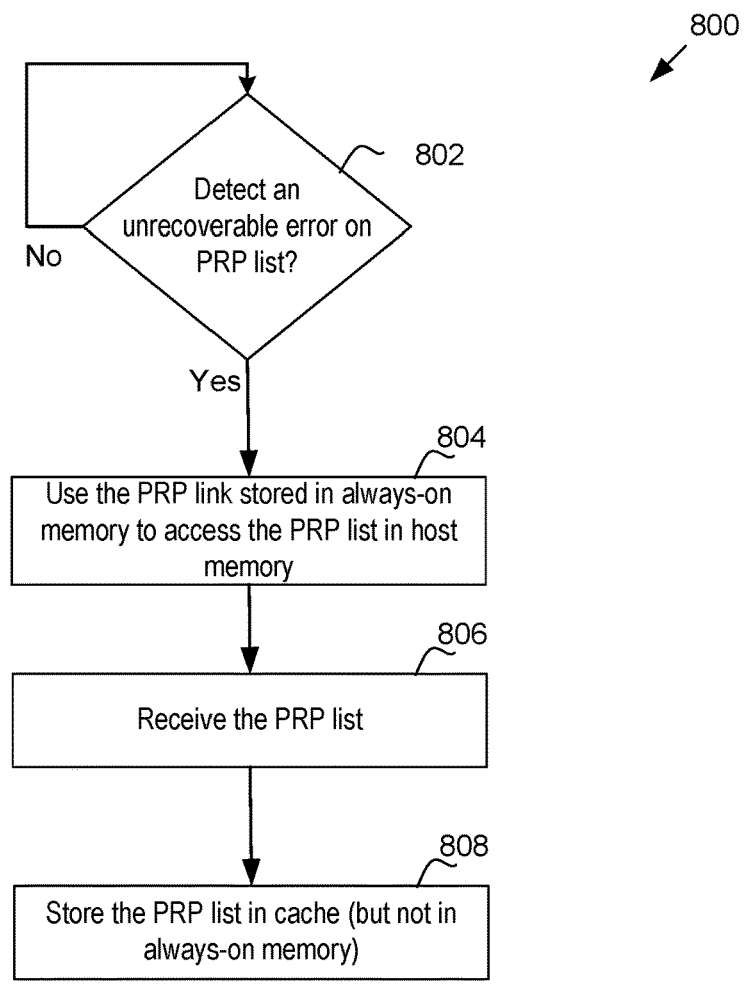
FIG. 8 is a flow chart of a first example of recreating the PRP list in response to an unrecoverable error.

There may be one or more instances where the PRP list is re-created. In one instance, the memory device releases the PRP list due to size constraints. For example, when the memory device is out of memory for a specific period of time, the PRP list caching storage may be deleted and used for another purpose. When releasing the memory back, the PRP lists may be retrieved from host memory, as illustrated in FIG. 8. As another example, the PRP list may be corrupted or unusable, and therefore may be re-created. As still another example, the memory device may enter low power mode and thus may remove power from the DRAM (or other section of memory) that stores the PRP list.

FIG. 8 is a flow chart 800 of a first example of recreating the PRP list in response to an unrecoverable error. At 802, it is determined whether the memory device has detected an unrecoverable error on the PRP list. If so, at 804, the PRP link that is stored in always-on memory may be used to access the PRP list in host memory. At 806, the memory device receives the PRP list responsive to the request to access the PRP list in host memory. At 808, the memory device stores the PRP list in cache, but not in always-on memory.

Figure 9:
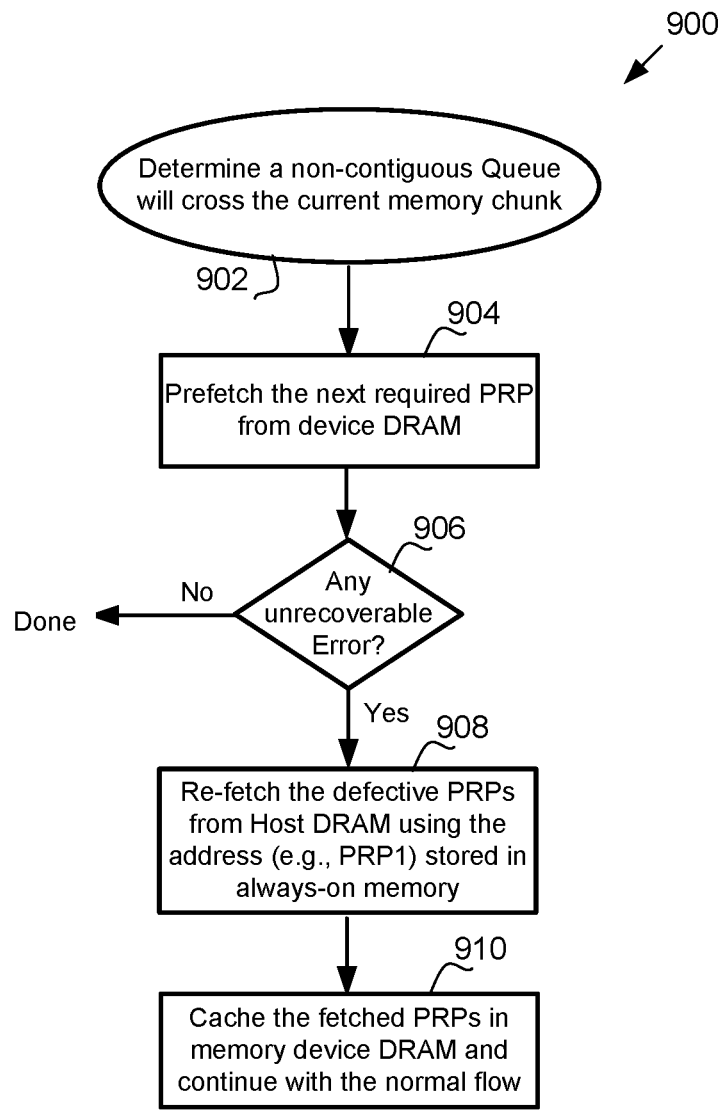
FIG. 9 is a flow chart of a second example of recreating the PRP list in response to an unrecoverable error.

FIG. 9 is a flow chart 900 of a second example of recreating the PRP list in response to an unrecoverable error. In particular, FIG. 9 illustrates the memory device flow when crossing or planning to cross a non-contiguous part of the queue. In particular, at 902, it is determined that a non-contiguous queue will cross the current memory chunk. At 904, the next required PRP is prefetched from memory device DRAM. At 906, the memory device determines whether there is any unrecoverable error. In particular, if the required PRP is stored in the cache and unrecoverable error is not detected, the memory device fetches the next PRP from the cache and continues normally. However, if either the required PRP is not stored in the cache (e.g., was removed due to being out of memory) or an unrecoverable PRP error was detected, at 908, the device re-fetches the defective PRPs from host memory using host pointers (e.g., PRP1) stored in the always-on memory. At 910, the memory device then caches the fetched PRPs in memory device DRAM and continues with the normal flow.

Figure 10:
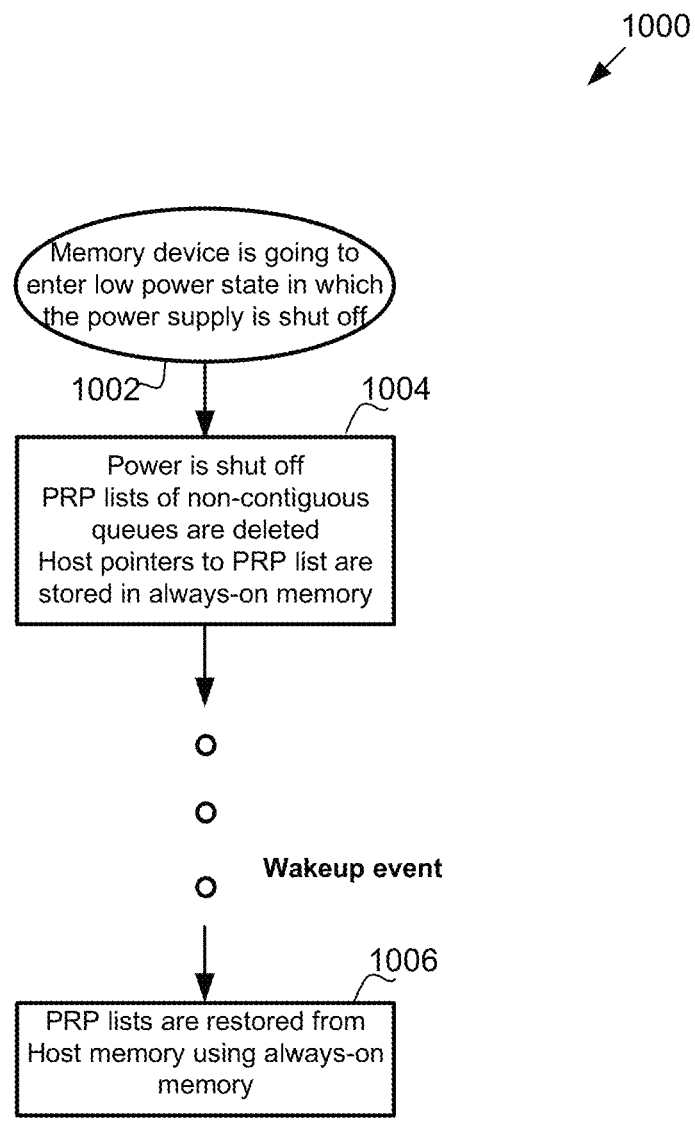
FIG. 10 is a flow chart of recreating the PRP list in response to entering and exiting low power mode.

FIG. 10 is a flow chart 1000 of recreating the PRP list in response to entering and exiting low power mode. When going to enter some of the low power modes, at 1002, the power supply to most of the memory device will be shut off. Due to the shut off, at 1004, the contents of internal flops and memories will not be retained. As discussed above, the memory device may include a very small logic named the always-on zone, which is active also during the low power modes. In one implementation, the always-on zone may contain a central processing unit (CPU), memories and small logic. More specifically, the always-on zone may be as small as possible in order to have better power consumption results while the memory device is in low power modes. In one implementation, the pointers to the PRP lists are stored in the always-on zone. For each non-contiguous queue, only 8 bytes are required for this purpose where some of the least significant bits (LSBs) are set to 0. In addition, some other queue attributes may be stored in this memory, such as a size of the queue, ID and type. Alternatively, the pointers to the PRP lists may be stored in non-volatile memory (such as flash memory).

When exiting the low power mode and going back to normal mode upon a wakeup event, the memory device reloads the cache of the non-contiguous queues storage. In particular, at 1006, the memory device re-fetches and restores the PRP lists from the host memory using the information stored in the always-on memory.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
   storing, in a first type of memory in a memory device, a link to a list of non-contiguous sections in host memory that defines a non-contiguous queue;
   storing part or all of the list of non-contiguous sections in a second type of memory in the memory device, the first type of memory maintaining data therein during at least a part of operation of the memory device in which data is not maintained in the second type of memory;
   determining to re-store at least a part of the list of non-contiguous sections; and
   in response to determining to re-store the at least a part of the list of non-contiguous sections, re-storing the at least a part of the list of non-contiguous sections by:
      accessing the link stored in the first type of memory in the memory device;
      using the link to access in the host memory at least a part of the list of non-contiguous sections; and
      re-storing the at least a part of the list of non-contiguous sections in the second type of memory.

2. The method of claim 1, wherein the first type of memory comprises always-on memory.

3. The method of claim 2, wherein:
   the first type of memory maintains the data therein during a low power mode of the memory device; and
   the second type of memory does not maintain the data therein during the low power mode of the memory device.

4. The method of claim 1, wherein:
   the first type of memory comprises a first type of cache; and
   the second type of memory comprises a second type of cache.

5. The method of claim 1, wherein the list of non-contiguous sections comprises a list of physical region pages.

6. The method of claim 1, wherein determining to re-store at least a part of the list of non-contiguous sections is performed in response to the memory device exiting low power mode.

7. The method of claim 1, wherein determining to re-store at least a part of the list of non-contiguous sections is performed in response to determining that the part or all of the list of non-contiguous sections stored in the second type of memory is corrupted.

8. The method of claim 1, wherein:
   the memory device determines a section of the list of non-contiguous sections stored in the second type of memory that is corrupted; and
   re-storing the at least a part of the list of non-contiguous sections comprises re-storing the section of the list of non-contiguous sections that is corrupted.

9. The method of claim 1, wherein:
   storing part or all of the list of non-contiguous sections in the second type of memory comprises storing all of the list of non-contiguous sections in the second type of memory; and
   re-storing the at least a part of the list of non-contiguous sections in the second type of memory comprises re-storing all of the list of non-contiguous sections in the second type of memory.

10. The method of claim 1, wherein the non-contiguous queue is a non-contiguous submission queue.

11. The method of claim 1, wherein:
    the first type of memory comprises non-volatile memory; and
    the second type of memory comprises cache.

12. A memory device comprising:
    memory comprising a first type of memory and a second type of memory, the first type of memory maintaining data therein during a mode of the memory device and the second type of memory not maintaining data therein during the mode of the memory device; and
    a controller in communication with the memory, the controller configured to:
       store a link in the first type of memory, the link comprising an address in a host device to a list of non-contiguous sections for a queue;
       store part or all of the list of non-contiguous sections in the second type of memory;
       determine to enter the mode; and
       in response to determining to exit the mode:
          use the link stored in the first type of memory to access at least a part of the list of non-contiguous sections for the queue in the host device; and
          store the at least a part of the list of non-contiguous sections for the queue in the second type of memory.

13. The memory device of claim 12, wherein:
    the first type of memory comprises always-on memory; and
    the second type of memory comprises dynamic random access memory (DRAM).

14. The memory device of claim 13, wherein the controller is further configured to store all of the list of non-contiguous sections in the DRAM.

15. The memory device of claim 12, wherein:
    the first type of memory comprises non-volatile memory; and
    the second type of memory comprises cache memory.

16. The memory device of claim 12, wherein the mode comprises a low power mode.

17. The memory device of claim 16, wherein the controller is further configured to access the link in always-on memory to store the list of non-contiguous sections for the queue in dynamic random access memory (DRAM) responsive to the controller determining to exit the low power mode.

18. The memory device of claim 17, wherein the queue is a submission queue.

* * * * *